(12) United States Patent
Tsukamoto et al.

(10) Patent No.: US 9,092,453 B2
(45) Date of Patent: Jul. 28, 2015

(54) MONITORING DEVICE, INFORMATION PROCESSING APPARATUS, AND MONITORING METHOD

(71) Applicant: FUJITSU LIMITED, Kawasaki-shi, Kanagawa (JP)

(72) Inventors: Nina Tsukamoto, Koto (JP); Shinnosuke Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 13/902,847

(22) Filed: May 26, 2013

(65) Prior Publication Data

US 2014/0032965 A1  Jan. 30, 2014

(30) Foreign Application Priority Data

Jul. 30, 2012  (JP) .................. 2012-168094

(51) Int. Cl.
G06F 11/00 (2006.01)
G06F 11/30 (2006.01)
G06F 11/07 (2006.01)

(52) U.S. Cl.
CPC ........ *G06F 11/3024* (2013.01); *G06F 11/0706* (2013.01); *G06F 11/0751* (2013.01); *G06F 11/0772* (2013.01); *G06F 11/0778* (2013.01)

(58) Field of Classification Search
CPC .................. G06F 11/0778; G06F 11/0706
USPC .................. 714/45, 47.1, 48, 42, 54
See application file for complete search history.

(56) References Cited

U.S. PATENT DOCUMENTS 6,067,588 A  5/2000 Ito
2006/0136633 A1* 6/2006 Harima et al. ........... 710/104

FOREIGN PATENT DOCUMENTS

| JP | 57-6951 | 1/1982 |
|---|---|---|
| JP | 58-96326 | 6/1983 |
| JP | 10-207790 | 8/1998 |
| JP | 2004-348306 | 12/2004 |

* cited by examiner

*Primary Examiner* — Dieu-Minh Le
(74) *Attorney, Agent, or Firm* — Fujitsu Patent Center

(57) ABSTRACT

A monitoring device includes a detection unit which is inserted between the device to be monitored and a processing apparatus performing processing for the device to be monitored and detects a failure which occurs in the device to be monitored, a notification unit generating failure information indicating a content of the failure detected by the detection unit and notifying the generated failure information and the occurrence of the failure to the processing apparatus, and an acquisition unit acquiring status information after the occurrence of the failure of the device to be monitored from the device to be monitored and storing the acquired status information in a storage unit as the failure occurs.

20 Claims, 8 Drawing Sheets

FIG. 2

| LARGE ITEM | MEDIUM ITEM | CODE EXAMPLE |
|---|---|---|
| NOTIFICATION FROM CPU | INTERNAL ERROR OF CPU | 0x0_000_xxxx |
| | ERROR IN DISPOSED DEVICE | 0x0_0yy_xxxx |
| | ERROR IN TRANSMISSION CHANNEL | 0x0_1zz_xxxx |
| FPGA DETECTION | DETECT STATUS ERROR FROM REGISTER DUMP | 0x1_0yy_xxxx |
| | FAIL IN REGISTER DUMP (TIMEOUT) | 0x1_1yy_0001 |
| NOTIFICATION FROM DISPOSED DEVICE | | 0x2_1yy_xxxx | yy : DEVICE
zz : TRANSMISSION CHANNEL
xxxx : ERROR TYPE

MONITORING DEVICE, INFORMATION PROCESSING APPARATUS, AND MONITORING METHOD

CROSS-REFERENCE TO RELATED APPLICATION

This application is based upon and claims the benefit of priority of the prior Japanese Patent Application No. 2012-168094, filed on Jul. 30 2012, the entire contents of which are incorporated herein by reference.

FIELD

The invention relates to a monitoring device, an information processing apparatus, and a monitoring method.

BACKGROUND

In a system having redundancy, in the case where parts constituting the system break down, the system separates the broken-down parts to block a failure. A method which separates the broken-down parts may include, for example, cut-off of power of the broken-down part or cut-off of a switch of a high-speed transmission channel bus.

Preferably, firmware of the system correctly specify the broken-down parts when system internal abnormality is detected. In the system having the redundancy, when one module operates, the system can continuously operate, and as a result, it is very important to block the failure.

FIG. 7 is a diagram illustrating a configuration example of an information processing apparatus 100. As illustrated in FIG. 7, the information processing apparatus 100 includes a central processing unit (CPU) 200, a monitoring field programmable gate array (FPGA) 300, a non-volatile memory 400, and devices 500A to 500C.

The CPU 200 is a device that performs various controls or calculations in the information processing apparatus 100, and includes a core 210, a random access memory (RAM) 220, a high-speed interface (IF) 230, and a low-speed IF 240.

The core 210 performs various processing operations as the CPU 200. For example, the core 210 controls the device 500A through a high-speed transmission channel 700a by the high-speed IF 230 and controls the devices 500B and 500C via the device 500A. Further, the core 210 is connected with the respective devices 500A to 500C through a low-speed transmission channel 700b by the low-speed IF 240 for log collection.

The devices 500A to 500C are various devices constituting the information processing apparatus 100. The device 500A is, for example, a switch module, and is connected with the arranged devices 500B and 500C through the high-speed transmission channel 700a and connected with redundant another module through the high-speed transmission channel 700a. The devices 500B and 500C are redundant devices and for example, adapters which communicate with a device such as a disk device or a host device.

When the CPU 200 (core 210) detects abnormality in the devices 500A to 500C through the high-speed IF 230, the CPU 200 acquires a log (status information) such as a register dump from each of the devices 500A to 500C via the low-speed transmission channel 700b through the low-speed IF 240. Further, the CPU 200 stores the acquired log in a log area 220a of the RAM 220.

In addition, the CPU 200 specifies an occurrence location of the failure based on the acquired register dump and for example, when the occurrence location of the failure is the device 500A, the CPU 200 disconnects the device 500A from redundant another module in order to remove the failure from the system. In this case, the information processing apparatus 100 including the corresponding CPU 200 is separated from the another module and the system continuously operates by the another module.

Note that, the monitoring FPGA 300 is hardware that performs monitoring and controlling of an LED, a power supply, reset processing, or the like in the information processing apparatus 100 and the non-volatile memory 400 is a memory that holds information or the like on monitoring and controlling by the monitoring FPGA 300.

In addition, as a related technology, a technology is known, in which a processor transmits a content of a memory of a channel device or an error log control circuit to a main memory by occurrence of a failure, or the like (see, for example, Patent Literature 1 or 2).

Moreover, a technology is known, in which a log in normal times or detecting an error is accumulated in an internal buffer or the like by a login circuit or a logic circuit constituting hardware (see, for example, Patent Literature 3 or 4).

[Patent Literature 1] Japanese Laid-open Patent Publication No. 57-6951
[Patent Literature 2] Japanese Laid-open Patent Publication No. 58-96326
[Patent Literature 3] Japanese Laid-open Patent Publication No. 2004-348306
[Patent Literature 4] Japanese Laid-open Patent Publication No. 10-207790

In an example illustrated in FIG. 7, there is a risk that the CPU 200 enters exceptional processing to be hung up when there is no read response from the devices 500A to 500C at the time of acquiring the register dump.

FIG. 8 is a sequence diagram illustrating an operation example of the information processing apparatus 100 when the failure occurs in the device 500C illustrated in FIG. 7. As illustrated in FIG. 8, after power is input into the information processing apparatus 100 (step T110), when the failure occurs in the device 500C (step T120), an error is notified to the CPU 200 from the device 500C via the high-speed transmission channel 700a (step T130). When the error is notified, a dump is acquired (read) from a register (not illustrated in FIG. 7) of the device 500C via the low-speed transmission channel 700b by the CPU 200 (step T140).

Herein, in the case where the device 500C is unable to perform reading and responding due to the failure which occurs in the device 500C (step T150), the CPU 200 is hung up in completion and stand-by states of reading the register (step T160). In this case, since the CPU 200 is unable to collect the register dump when the failure occurs, the CPU 200 is unable to determine a failure location and the CPU 200 fails in separating the device 500C which is the broken down part, and as a result, the CPU 200 fails in blocking the error.

Further, when the CPU 200 fails in separating the device 500C, a failure state of the device 500C may be propagated to the device 500A through the high-speed transmission channel 700a (step T170). In this case, further, the failure state propagated to the device 500A is propagated to even the other module through an intermodule bus (high-speed transmission channel 700a) and both redundant modules stop operating, and as a result, the system may be continuously unavailable (machine down).

In this case, since the CPU 200 runs into an inoperative state during log collection, the register dump cannot also be collected from the device 500C when a phenomenon occurs.

Further, since the register dump cannot be collected, it is also difficult to investigate a cause after exchanging a broken-down module and for example, taking over the broken-down module into a factory.

Note that, in the aforementioned related technologies, the aforementioned is not considered.

SUMMARY

According to an aspect of the embodiments, a monitoring device which monitors a device to be monitored, includes a detection unit which is inserted between the device to be monitored and a processing apparatus performing processing for the device to be monitored and detects a failure which occurs in the device to be monitored, a notification unit which generates failure information indicating a content of the failure detected by the detection unit and notifies the generated failure information and the occurrence of the failure to the processing apparatus, and an acquisition unit which acquires status after the occurrence of the failure of the device to be monitored from the device to be monitored and stores the acquired status in a storage unit, as the failure occurs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of an error code generated by a failure detecting unit illustrated in FIG. 1;

DESCRIPTION OF EMBODIMENTS

Hereinafter, embodiments will be described with reference to the accompanying drawings.

[1] Embodiment

[1-1] Description of Information Processing Apparatus

Figure 1:
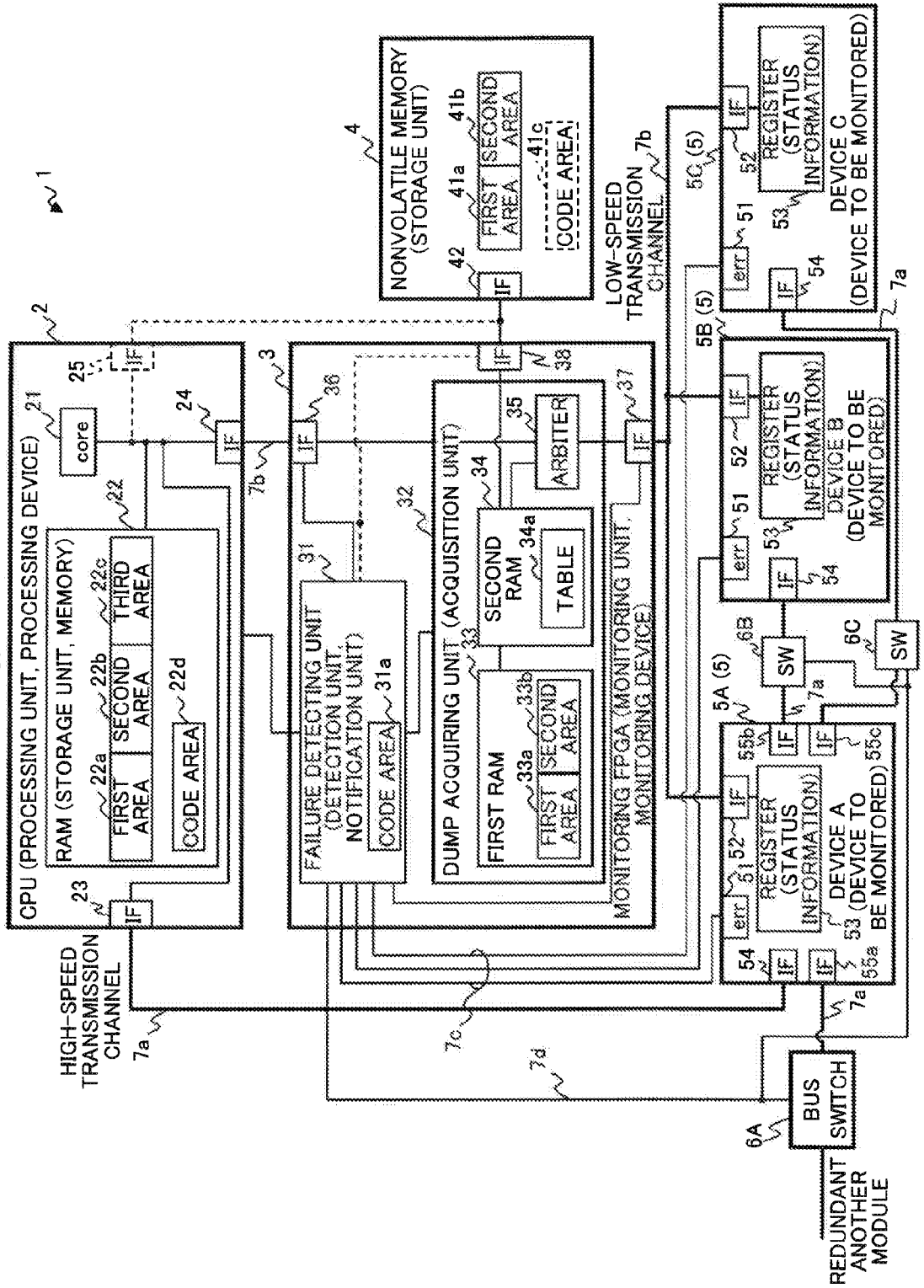
FIG. 1 is a block diagram illustrating a configuration example of an information processing apparatus according to an embodiment.

FIG. 1 is a block diagram illustrating a configuration example of an information processing apparatus 1 according to an embodiment. As illustrated in FIG. 1, the information processing apparatus 1 includes a CPU 2, a monitoring FPGA 3, a non-volatile memory 4, devices 5A to 5C, and bus switches 6A to 6C. Note that, the information processing apparatus 1 according to the embodiment is doubled from another module connected through the bus switch 6A and operates as an information processing system (system) by the information processing apparatus 1 and the other module.

The CPU (processing unit, processing device) 2 is a device that performs processing such as various controls or calculations in the information processing apparatus 1 including the devices 5A to 5C, and includes a core 21, a RAM 22, a high-speed IF 23, and a low-speed IF 24.

The core 21 performs various processing operations as the CPU 2 and implements various functions by executing a program stored in a RAM (not illustrated) or a read only memory (ROM).

In the embodiment, processing to acquire a log (status information) such as the register dump from the devices 5A to 5C is performed by the monitoring FPGA 3. As a result, the core 21 may write a collected address or a collected data length of an arranged device, which collects the log, in an internal table 34a of the monitoring FPGA 3. Further, in the case where the core 21 intends to collect the log of each of the devices 5A to 5C in the CPU 2, the core 21 may instruct the monitoring FPGA 3 to collect a log.

The RAM (storage unit, memory) 22 is a storage device that stores the log or the like of each of the devices 5A to 5C, which is collected by the monitoring FPGA 3. The RAM 22 includes a first area 22a storing a log of a periodic dump to be described below, a second area 22b storing a log of a trigger dump, a third area 22c storing a log of a bypass dump, and a code area 22d storing an error code indicating a content of a failure which occurs. The areas 22a to 22d will be described in detail in the monitoring FPGA 3. Note that, the RAM 22 may include, for example, a static RAM (SRAM), or the like.

The high-speed IF 23 is an interface that controls communication with the device 5A and that controls communications with the devices 5B and 5C via the device 5A, in connection with the device 5A through a high-speed transmission channel 7a. Note that, the high-speed transmission channel 7a may include, for example, a peripheral component interconnect express (PCIeX) or a serial attached SCSI (small computer system interface) (SAS). The core 21 transmits user data, control information, or the like among the devices 5A to 5C through the high-speed IF 23.

The low-speed IF 24 is an interface that is connected with the monitoring FPGA 3 through a low-speed transmission channel 7b to control communication of information on the log (status information) such as the register dump of the devices 5A to 5C from the monitoring FPGA 3. Note that, the low-speed transmission channel 7b may include, for example, an inter-integrated circuit (I2C), a serial general purpose input/output (SGPIO), or a serial peripheral interface (SPI). The core 21 instructs the monitoring FPGA 3 to collect a log through the low-speed transmission channel 7b and stores a log received from the monitoring FGPA 3 through the low-speed transmission channel 7b in a predetermined area of the RAM 22.

Figure 7:
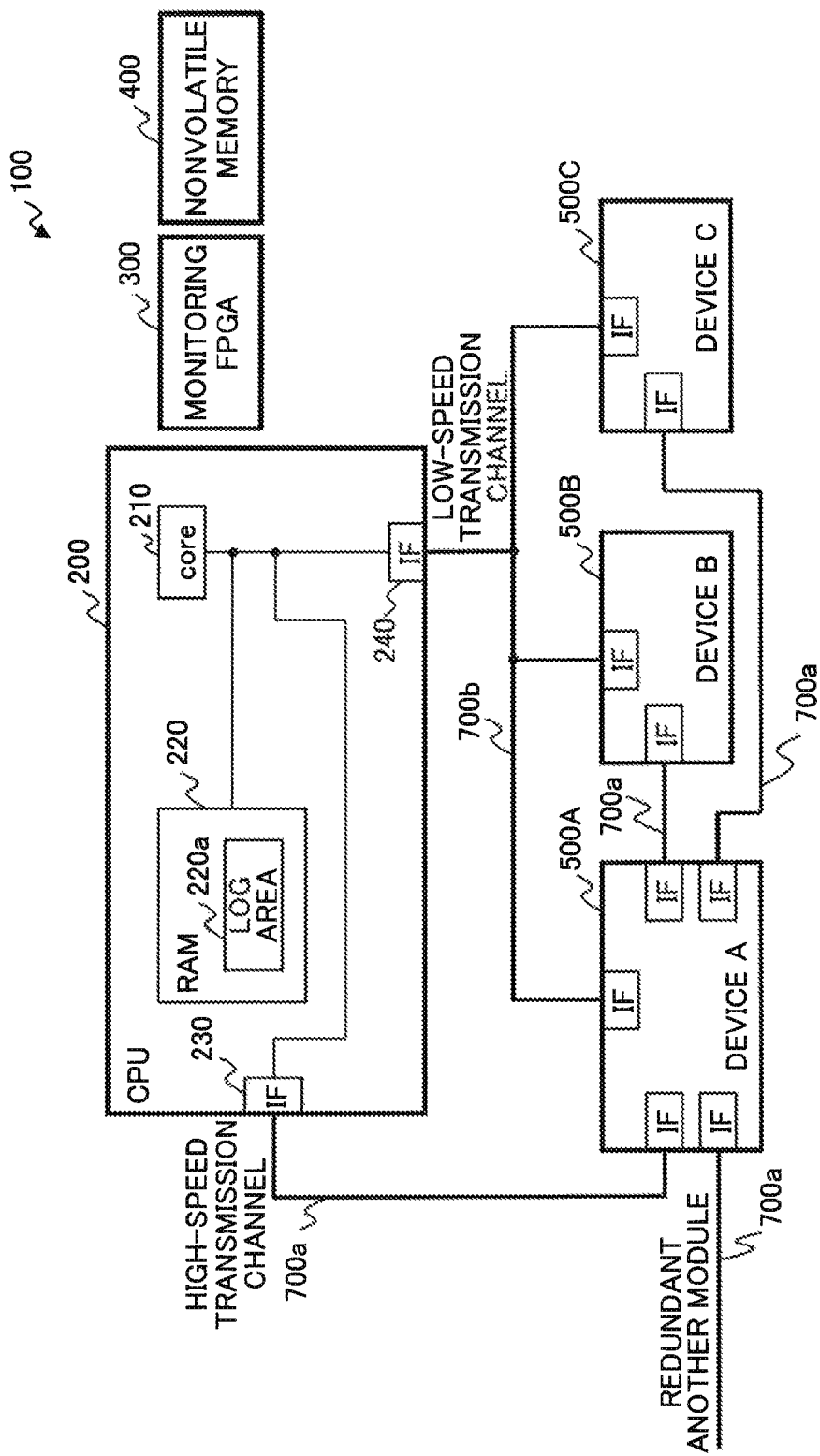
FIG. 7 is a diagram illustrating a configuration example of an information processing apparatus.
Figure 8:
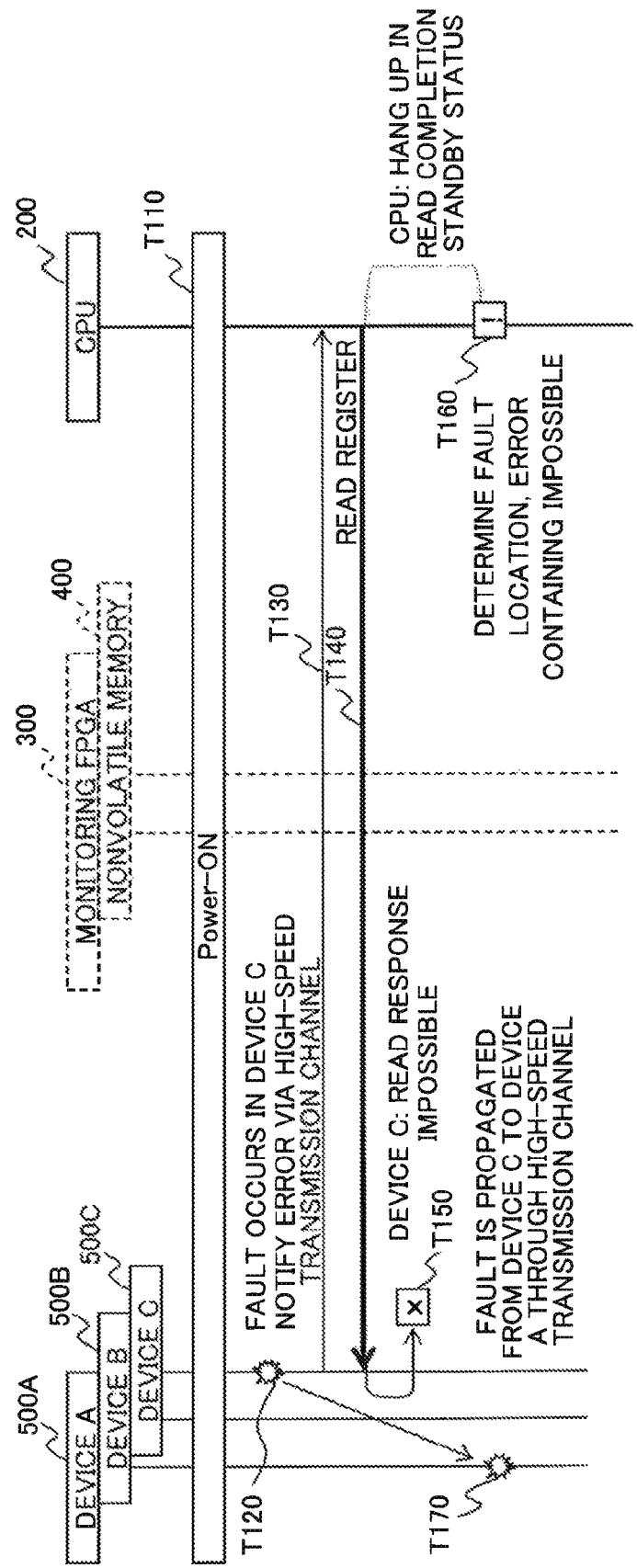
FIG. 8 is a sequence diagram illustrating an operation example of the information processing apparatus when a failure occurs in a device illustrated in FIG. 7.

The monitoring FPGA (monitoring unit, monitoring device) 3 is hardware that acquires the log from the devices 5A to 5C and is inserted between the devices 5A to 5C and the CPU 2. Further, the monitoring FPGA 3 may perform monitoring and controlling such as an LED, a power supply, reset processing, or the like in the information processing apparatus 1, similarly as a monitoring FPGA 300 illustrated in FIG. 7. Note that, the monitoring FPGA 3 may include an integrated circuit (IC), such as an FPGA, a programmable logic device (PLD), large scale integration (LSI), or a microcomputer, or the like.

The monitoring FPGA 3 according to the embodiment serves to read contents of a plurality of registers 53 of a plurality of arranged devices 5A to 5C and perform a function of the register dump to write the read contents in the monitoring FPGA 3, the non-volatile memory 4, and the RAM 22 in the CPU 2. An aspect of the register dump by the monitoring FPGA 3 may include, for example, periodic dump which is periodically performed in a general state (a state in which the failure is not detected), trigger dump performed after the failure is detected, and bypass dump performed by the instruction from the CPU 2. The monitoring FPGA 3 will be described in detail below.

The non-volatile memory (storage unit) 4 is a non-volatile memory to which the CPU 2 is accessible and may adopt various memories such as a flash memory, or the like. The non-volatile memory 4 includes a first area 41a storing the log of the periodic dump, a second area 41b storing the log of the trigger dump, and an IF 42 as an interface which controls communication with the monitoring FPGA 3 (and the CPU 2). Further, the non-volatile memory 4 may additionally hold the information or the like on monitoring and controlling such as the LED, the power supply, and the reset processing by the monitoring FPGA 3.

The devices 5A to 5C are various devices included in the information processing apparatus 1. Hereinafter, in the case where the devices 5A to 5C are not distinguished from each other, the devices 5A to 5C are simply called a device 5. Further, in the figures, the devices 5A to 5C may be written by devices A to C, respectively.

The device 5A is, for example, a switch module, and is connected with the arranged devices 5B and 5C through the high-speed transmission channel 7a and connected with redundant another module through the high-speed transmission channel 7a. The devices 5B and 5C are redundant devices and for example, adapters which communicate with a device such as a disk device or a host device.

Each device 5 includes an error notifying unit 51, a low-speed IF 52, a register 53, and a high-speed IF 54. Further, the device 5A further includes high-speed IFs 55a to 55c.

The error notifying unit 51 of each device 5 is connected with the monitoring FPGA 3 through an exclusive transmission channel (signal line) 7c for notifying the occurrence of the failure. Each device 5 performs error notification (notification by a signal FATAL_ERROR) via the exclusive transmission channel 7c when a failure, which conforms to a predetermined notification condition, occurs. The notification by the signal FATAL_ERROR by the devices 5A to 5C is preferably performed by a simple and high-speed method such as, for example, outputting "0" in a normal state and "1" in an abnormal state. Note that, since as the predetermined notification condition, various notification conditions, which are already known, may be used, such as a condition in which a predetermined part in the device 5 breaks down, the failure which occurs is at a higher level than a predetermined failure, or the like, a detailed description thereof will not be made.

The low-speed IF 52 is connected with the monitoring FPGA 3 through the low-speed transmission channel 7b to transmit dump of the register 53 according to a read request of the register dump from the monitoring FPGA 3 (read response). The high-speed IF 54 is an interface that controls communication with an upstream (CPU 2 side) device through the high-speed transmission channel 7a.

Further, the high-speed IFs 55a to 55c of the device 5A are connected with the bus switches 6A to 6C through the high-speed transmission channel 7a, respectively. The high-speed IF 55a is connected with the redundant another module through the bus switch 6a, the high-speed IF 55b is connected with the high-speed IF 54 of the device 5B through the bus switch 6B, and the high-speed IF 55c is connected with the high-speed IF 54 of the device 5C through the bus switch 6C.

The register 53 of each device 5 is a target register which is subjected to the register dump by the monitoring FPGA 3 by holding an internal operational state or setting information. A content of the register 53 is used as a log (status information) before and after the failure occurs in the device 5 by the monitoring FPGA 3.

The bus switches 6A to 6C are switches that switch a connection state between the information processing apparatus 1 and another module, a connection state between the devices 5A and 5B, and a connection state between the devices 5A and 5C, respectively. The bus switches 6A to 6C are connected with the monitoring FPGA 3 through a control line 7d, respectively, and as a result, the connection states are switched by the monitoring FPGA 3.

For example, in the case where the failure does not occur in the device 5, the bus switch 6A interconnects the information processing apparatus 1 and another module to maintain a redundant state. Further, in this case, the bus switch 6B interconnects the devices 5A and 5B and the bus switch 6C interconnects the devices 5A and 5C to maintain a redundant state of the devices 5B and 5C.

Meanwhile, when the failure occurs in the device 5B or 5C, the monitoring FPGA 3 controls the bus switch 6B or 6C at a side where the failure occurs so as to turn off (cut off) the device 5B or 5C and separate the device 5B or 5C where the failure occurs from the system. Further, when the failure occurs in the device 5A, the monitoring FPGA 3 controls the bus switch 6A so as to turn off (cut off) the device 5A and separate the device 5A where the failure occurs and the arranged devices 5B and 5C from the system. Note that, when the bus switch 6A is turned off, the entire information processing apparatus 1 including the CPU2 as well as the device 5 is separated from the redundant another module. In this case, the system continuously operates by another module.

[1-2] Description of Monitoring FPGA

The monitoring FPGA 3 includes a failure detecting unit 31, a dump acquiring unit 32, and respective IFs 36 to 38.

The dump acquiring unit (acquisition unit) 32 performs the log collection such as the register dump and includes a first RAM 33, a second RAM 34, and an arbiter 35.

The second RAM 34 stores a table 34a that shows a log collection target (a target location of the register dump) in the periodic dump or the trigger dump. In the table 34a, for example, a collection address and a collection data length may correspond to each other. The collection address and the collection data length are instructed through the low-speed transmission channel 7b in advance by the CPU 2 as already described. In detail, the CPU 2 creates or updates the table 34a in which the collection address and the collection data length correspond to each other with respect to the second RAM 34 in the monitoring FPGA 3 at a predetermined timing such as the time when the information processing apparatus 1 starts up. Hereinafter, an address and a predetermined data length of each of register 53 of each of the devices 5A to 5C which correspond to each other are held in the table 34a.

The dump acquiring unit 32 periodically acquires a log having the predetermined data length from each register 53 of the device 5 based on the setting information of the table 34a (periodic dump). Note that, the periodic dump is performed at a predetermined cycle or a predetermined timing. The predetermined cycle or the predetermined timing may be determined and notified by, for example, the CPU 2 or set in advance in manufacturing or releasing, starting-up, or the like.

Further, the dump acquiring unit 32 acquires a log having a predetermined data length after the failure occurs as a trigger such as the occurrence of the failure is detected (trigger dump). In this case, the dump acquiring unit 32 suppresses execution of the periodic dump after the failure occurs. Note that, the detection of the trigger will be described below.

Herein, the dump acquiring unit 32 stores the acquired log in the first area 33a of the first RAM 33 when the periodic dump is performed. In addition, the dump acquiring unit 32 transmits and stores the log stored in the first area 33a to and in each of the first area 22a of the RAM 22 of the CPU 2 and the first area 41a of the non-volatile memory 4.

Meanwhile, the dump acquiring unit 32 stores the acquired log in the second area 33b of the first RAM 33 when the trigger dump is performed. Note that, the dump acquiring unit 32 transmits and stores the log stored in the second area 33b to and in each of the second area 22b of the RAM 22 of the CPU 2 and the second area 41b of the non-volatile memory 4.

In addition, the dump acquiring unit 32 uses the first area 33a and the second area 33b in the first RAM 33 as working areas.

Like this, by the dump acquiring unit 32, the log collected by the periodic dump before the failure occurs and log collected by the trigger dump after the failure occurs are stored in different areas. Further, by the dump acquiring unit 32, when the trigger dump is executed as the failure occurs, the execution of the periodic dump is suppressed, and thus the periodic dump is executed after the failure occurs to thereby prevent the log by the periodic dump before the failure occurs from being covered with the log after the failure occurs.

Therefore, in the information processing apparatus 1, the logs before and after the failure occurs may be securely held and analysis of the failure which occurs, such as specifying a failure cause, may be easily performed.

Further, the dump acquiring unit 32 has a bypass function to directly transfer an access to the low-speed transmission channel 7b from the CPU 2 to each arranged device 5. In detail, when receiving the register dump request (an acquisition request of the log, hereinafter, referred to as a dump request) of the device 5 from the CPU 2, the dump acquiring unit 32 acquires the log from the device 5 instructed by the dump request (bypass dump). In this case, the dump acquiring unit 32 transmits and stores the acquired log to and in the third area 22c in the RAM 22 of the CPU 2.

By the bypass dump, the CPU 2 may perform status reading of a predetermined arranged device 5 by using the bypass function even during the periodic dump or the trigger dump by the monitoring FPGA 3.

Note that, the dump request from the CPU 2 may be a request that represents acquisition of a log as long as a predetermined data length from a collection address which is not set in the table 34a in the arranged device of the monitoring FPGA 3 and in this case, the dump request includes the collection address and the predetermined data length. Further, the dump request may be a request that represents acquisition of a log as long as a collection data length from all or some of the collection addresses set in the table 34a and in this case, the dump request may include information that specifies all records or a predetermined record of the table 34a.

Like this, the dump acquiring unit 32 does not cause read processing by the CPU 2 even in the case of any one register dump of the periodic dump, the trigger dump, and the bypass dump. That is, actually, the register dump is processing of reading the log from the device 5, but the CPU 2 instructs the monitoring FPGA 3 to collect a log (in the case of the bypass dump) and waits for completion of write processing of the monitoring FPGA 3 in the internal RAM 22.

That is, the register dump according to the embodiment is performed by a flow of the instruction of the register dump, the write processing by the monitoring FPGA 3, and completion waiting of the corresponding write processing, in the CPU 2. Therefore, the CPU 2 may avoid entering exceptional processing in order to prevent the read processing even in the case where a failure such as no read response occurs in the device 5 and safely acquire the log such as the register dump by referring to the RAM 22.

The arbiter 35 arbitrates the periodic dump or the trigger dump and dump by the dump request according to a predetermined policy. According to the policy, any one register dump of the periodic dump, the trigger dump, and the bypass dump may be preferentially executed. The arbiter 35 issues the read request of the register to the target device 5 by selecting any one register dump of the executed register dumps according to the policy.

The IFs 36 to 38 are interfaces that control communication of information such as the log, and the like among IFs of connection points, respectively.

The low-speed IF 36 is connected with the low-speed IF 24 of the CPU 2 through the low-speed transmission channel 7b. The low-speed IF 36 receives the dump request of the bypass dump or the information such as the collection address and the collection data length established in the table 34a which is transmitted from the core 21 through the low-speed IF 24 and hands over the dump request or the information to the dump acquiring unit 32. Further, the low-speed IF 36 transmits the log collected by the dump acquiring unit 32 or an error code to be described below, which is created by the failure detecting unit 31, to the low-speed IF 24. Note that, the low-speed IF 24 stores the log or the error code received from the low-speed IF 36 in the RAM 22.

The low-speed IF 37 is connected with the low-speed IF 52 of each device 5 through the low-speed transmission channel 7b. The low-speed IF 37 transmits the read request for the register dump to the low-speed IF 52, while the low-speed IF 37 receives register dump which is a response to the read request transmitted from the low-speed IF 52 and hands over the received register dump to the dump acquiring unit 32.

The IF 38 is connected with the IF 42 of the non-volatile memory 4 through a transmission channel. The IF 38 transmits the log collected by the dump acquiring unit 32 to the IF 42.

The failure detecting unit 31 detects a trigger for executing the trigger dump in the dump acquiring unit 32 and notifies the detection of the trigger to the CPU 2.

Herein, the trigger may include, for example, the case in which the failure occurs in the arranged device 5. Further, the detection of the trigger represents a case in which the failure detecting unit 31 receives a notification that the failure occurs in the devices 5A to 5C from the CPU 2 or a case of detecting the failure which occurs in the devices 5A to 5C, in the monitoring FPGA 3. Hereinafter, a case in which it is determined that the failure detecting unit 31 detects the trigger will be described by using a detailed example.

[1-2-1] In Regard to the Detection of the Trigger

The failure detecting unit 31 determines detecting the failure (detecting the trigger) to notify the detection of the failure to the CPU 2 and the dump acquiring unit 32 when at least one event occurs among (i) to (iii) below.

(i) The case in which the CPU 2 detects abnormality in the inside of the CPU 2, the high-speed transmission channel 7a, the device 5, or the like and notifies the error to the monitoring FPGA 3.

In detail, the CPU 2 determines that the abnormality occurs in the CPU 2 in the case where the error is detected in the CPU 2. Further, the CPU 2 determines that the failure occurs in the high-speed transmission channel 7a itself in the case where the abnormality is detected in the high-speed transmission channel 7a. Moreover, the CPU 2 determines that the abnormality occurs in the device 5 in the case where the error is notified from the device 5 via the high-speed transmission channel 7a or communication between the CPU 2 and the device 5 times out or the like. In these cases, the CPU 2 notifies the occurrence of the error and content thereof to the monitoring FPGA 3 via the low-speed transmission channel 7b, for example. The failure detecting unit 31 determines detecting the trigger in the case where the occurrence of the error is notified from the CPU 2 through the low-speed IF 36 or the dump acquiring unit 32.

Note that, in the case where the CPU 2 determines that the abnormality occurs in the device 5 through the high-speed transmission channel 7a, the CPU 2 may instruct the dump acquiring unit 32 to execute the bypass dump for the occurrence location (the device 5) of the failure, before the trigger dump by the dump acquiring unit 32. In this case, the monitoring FPGA 3 detects the failure which occurs in the device 5 through the bypass dump. Therefore, in the case where the CPU 2 instructs the monitoring FPGA 3 to execute the bypass dump by detecting the abnormality in the device 5, the CPU 2 does not have to notify the error to the monitoring FPGA 3.

(ii) The case in which the abnormality in the arranged device 5 is detected in the register dump by the monitoring FPGA 3 (the dump acquiring unit 32).

For example, the dump acquiring unit 32 may determine whether the device 5 is normal from a status of the acquired log. Therefore, the dump acquiring unit 32 may detect an error status (abnormal status) of the arranged device 5 from the log acquired by the register dump. In this case, the failure detecting unit 31 determines that the trigger is detected by detecting the error status of the device 5 through the dump acquiring unit 32.

Further, in the case where the dump acquiring unit 32 issues the read request to each device 5 via the low-speed transmission channel 7b due to the register dump such as the periodic dump or the like, a timeout occurs in the dump acquiring unit 32 when the read response is not received from the device 5 by the occurrence of the failure. In this case, the failure detecting unit 31 determines that the trigger is detected by detecting impossible reading through the low-speed IF 37 or the dump acquiring unit 32.

(iii) The case in which the error is notified from the arranged device 5 through the exclusive transmission channel 7c or the error is notified by error message communication through the low-speed transmission channel 7b.

The failure detecting unit 31 determines that the trigger is detected when receiving an error notification (FATAL_ERROR notification) from the device 5 through the exclusive transmission channel 7c.

Further, in the case where the failure occurs in each device 5, each device 5 may transmit an error message through the low-speed transmission channel 7b (error message communication). Therefore, the failure detecting unit 31 may determine that the trigger is detected in the case where the error is notified by the error message communication from the device 5.

The failure detecting unit 31 executes the trigger dump by notifying the occurrence of the failure to the dump acquiring unit 32 when detecting the trigger as described above.

Further, the failure detecting unit 31 encodes the content of the failure based on the detected event among the cases of (i) to (iii) and creates the encoded information (abnormal information) in its own code area 31a, when detecting the trigger as described above. In addition, the failure detecting unit 31 transmits and stores the created error code to and in the code area 22d in the RAM 22 of the CPU 2 through the low-speed transmission channel 7b. Further, the failure detecting unit 31 notifies the occurrence of the failure to the CPU 2 by interruption. Hereinafter, the error code created by the failure detecting unit 31 will be described.

[1-2-2] In Regard to the Error Code

FIG. 2 is a diagram illustrating an example of the error code created by the failure detecting unit 31 illustrated in FIG. 1.

As illustrated in FIG. 2, the failure detecting unit 31 prepares an error code including a detection path of the failure, an occurrence location of the failure, and an error type.

For example, the error code includes "0x0" in the case of the notification (corresponding to the (i)) from the CPU 2, "0x1" in the case of the detection (corresponding to the (ii)) by the monitoring FPGA 3, and "0x2" in the case of the notification (corresponding to the (iii)) from the arranged device 5, as the detection path of the failure, as illustrated in a "large category" of FIG. 2.

Further, the error code includes "000" in the case of the inside of the CPU, "0yy" or "1yy" in the case of the arranged device 5, "1zz" in the case of the transmission channel (high-speed transmission channel 7a), and the like, as the occurrence location of the failure, as illustrated in a "medium item" of FIG. 2. Note that, "yy" and "zz" included in the error code are identifiers such as IDs that specify the device 5 and the transmission channel, respectively.

Moreover, the error code includes "0001" in the case of the timeout and "xxxx" which is various other error types, as the error type, as illustrated in a "code example" of FIG. 2. Note that, "xxxx" is determined in advance for each type of the failure detectable by the monitoring FPGA 3 and for each type of the failure that the CPU 2 or the device 5 is capable of notifying to the monitoring FPGA 3.

Like this, the failure detecting unit 31 creates the error code based on the detected event when detecting the trigger. As an example, the failure detecting unit 31 creates an error code of "0x2_1yy_xxxx" in the code area 31a when receiving the notification related to the error from the arranged device. In addition, the failure detecting unit 31 transmits and stores the created error code to and in the code area 22d of the CPU 2 and notifies the occurrence of the failure to the CPU 2 by interruption.

As described above, the CPU 2 (core 21), which receives the notification by interruption from the failure detecting unit 31, may obtain the content of the failure which occurs by referring to the error code (the content of the failure) indicating the abnormal status stored in the code area 22d. As a result, the CPU 2 may suppress an issue of the read request or the like for the device 5 which is unable to reply to the read response by the occurrence of the failure, for example.

From the above, the failure detecting unit 31 according to the embodiment has a function as a detection unit that detects the failure which occurs in the devices 5A to 5C. Further, the failure detecting unit 31 has a function as the notification unit that creates an error code representing a content of the failure detected by the detection unit and notifies the created error code and the occurrence of the failure to the CPU 2.

Note that, when the failure detecting unit 31 notifies the created error code and the occurrence of the failure to the CPU 2, the failure detecting unit 31 resets the occurrence location (the device 5) of the failure, and separates the device 5 where the failure occurs from the system by controlling the bus switches 6A to 6C through the control line 7d as described above. Note that, when the CPU 2 detects the abnormality in the device 5 through the high-speed transmission channel 7a, the CPU 2 may instruct the failure detecting unit 31 to reset the occurrence location of the failure and separate the device where the failure occurs from the system.

As described above, in the information processing apparatus 1 according to the embodiment, even in the case where the failure without the read response occurs in the device 5, the monitoring FPGA 3 may significantly acquire the log and significantly suppress the failure, which occurs in the device 5, from being propagated to another module, while the CPU 2 continuously operates.

[1-3] In Regard to a Storage Location of the Log and the Error Code

Note that, as described above, the dump acquiring unit 32 stores the log acquired by the register dump in the first RAM 33 of the monitoring FPGA 3, the RAM 22 of the CPU 2, and the non-volatile memory 4. Further, the failure detecting unit 31 stores the error code created by the detection of the trigger in the dump acquiring unit 32 of the monitoring FPGA 3 and the RAM 22 of the CPU 2. Herein, a storage location of the log by the dump acquiring unit 32 and a storage location of the error code by the failure detecting unit 31 may be only at least one of the RAM 22 of the CPU 2 and the non-volatile memory 4 for the following reason.

The non-volatile memory 4 may continuously hold the stored information even in the case where the information processing apparatus 1 is in a system down state. That is, the dump acquiring unit 32 stores the log of the register dump in the first area 41a and the second area 41b to leave the log in spite of intervening in power-off of the information processing apparatus 1 by the occurrence of the failure.

Therefore, even in the case of an aspect in which the log of the register dump is not stored in the RAM 22 of the CPU 2 and the first RAM 33 of the monitoring FPGA 3, the log may be stored at least in the non-volatile memory 4 which is accessible from the CPU 2. For example, in the case where the log is stored in only the non-volatile memory 4, if the CPU 2 accesses the non-volatile memory 4, the CPU 2 may collect the log before and after the failure occurs. Further, a risk of log loss caused by the power-off may be reduced.

Further, the failure detecting unit 31 may store the error code created by the detection of the trigger in the code area 41c (expressed by a dotted line in FIG. 1) of the non-volatile memory 4 together with or instead of the code area 22d of the CPU 2. In this case, the failure detecting unit 31 stores the error code in the code area 41c of the non-volatile memory 4, and as a result, the CPU 2 acquires the error code from the non-volatile memory 4 to easily obtain a content of the failure which occurs before the power-off in spite of intervening in the power-off of the information processing apparatus 1 by the occurrence of the failure.

Note that, even though the error code is stored in only the code area 41c of the non-volatile memory 4, the failure detecting unit 31 notifies the occurrence of the failure to the CPU 2.

Further, in the case where the non-volatile memory 4 is at least used as the storage location of the log or the error code, the CPU 2 further includes an IF 25 (expressed by a dotted line in FIG. 1) for communicating with the IF 42 of the non-volatile memory 4. Further, the failure detecting unit 31 is connected with the IF 38 as expressed by the dotted line in FIG. 1 in order to store the created error code in the code area 41c of the non-volatile memory 4.

Up to now, although an advantage achieved by storing the log and the error code of the register dump in the non-volatile memory 4 has been described, there is also an advantage achieved by storing the log and the error code with respect to the CPU 2. For example, the CPU 2 may analyze the log or the error code at a higher speed than accessing the non-volatile memory 4, and as a result, a risk to make a request for accessing (reading or the like) the devices 5A to 5C where the failure occurs may be reduced.

As described above, the monitoring FPGA 3 according to the embodiment stores a monitoring result including the log (status information) of the register dump or the like and the error code indicating the content of the failure which occurs in at least one storage unit of the RAM 22 of the CPU 2 and the non-volatile memory 4.

[1-4] Configuration Example of Information Processing System

Figure 3:
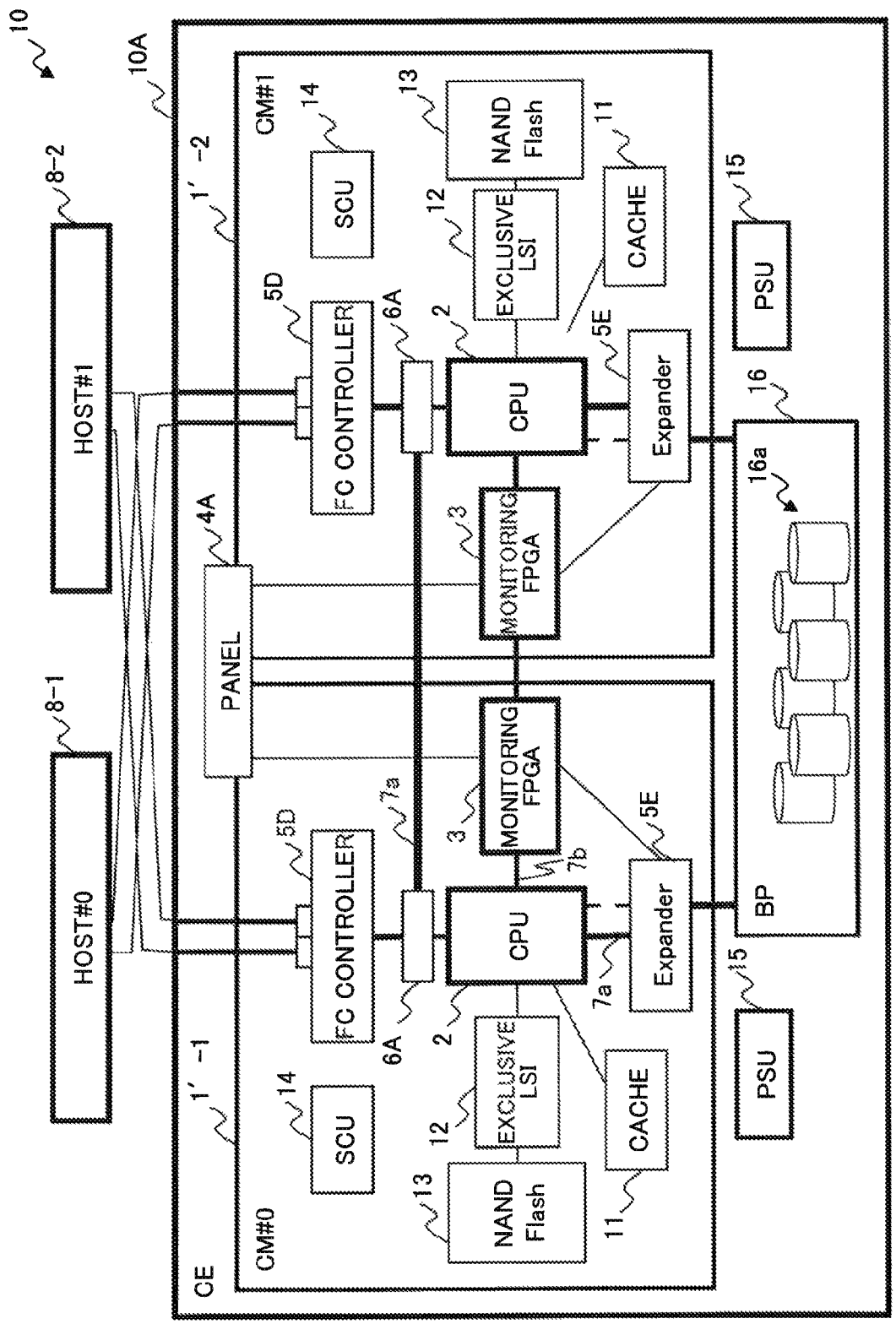
FIG. 3 is a block diagram illustrating a configuration example of a storage system to which the information processing apparatus illustrated in FIG. 1 can be applied.

The aforementioned information processing apparatus 1 may be applied to, for example, a storage system 10 illustrated in FIG. 3. FIG. 3 is a block diagram illustrating a configuration example of the storage system 10 to which the information processing apparatus 1 illustrated in FIG. 1 can be applied.

As illustrated in FIG. 3, the storage system (information processing system) 10 includes a controller enclosure (hereinafter, referred to as CE) 10A and host apparatuses 8-1 and 8-2. The host apparatuses 8-1 and 8-2 are host computers that make various requests to the CE 10A. The CE 10A controls various requests from the host apparatuses 8-1 and 8-2. The CE 10A includes a controller modules (hereinafter, referred to as CM) 1'-1 and 1'-2, a panel 4A, a power supply unit (PSU) 15, and a back plane (hereinafter, referred to as BP) 16.

The CMs 1'-1 and 1'-2 (hereinafter, simply referred to as CM 1' in the case where the CMs 1'-1 and 1'-2 are not distinguished from each other) are one example of the information processing apparatus 1 according to the embodiment. The CMs 1'-1 and 1'-2 are doubled. The panel 4A, which manages various setting information in the CE 10A, is commonly used as the CM 1'. Note that, the panel 4A includes a non-volatile memory which is one example of the non-volatile memory 4 according to the embodiment. The PSU 15 is a component that converts AC voltage from the outside to DC voltage and supplies the DC voltage to each device in the CE 10A. The BP 16 is a circuit board including a plurality of disk devices 16a. Note that, the disk device 16a may include various devices such as a magnetic disk device such as a hard disk drive (HDD) or a semiconductor drive device such as a solid state drive (SSD).

The CM 1' performs processing such as a data access request to the disk device 16a according to requests from the host apparatuses 8-1 and 8-2. The CM 1' includes a CPU 2, a monitoring FPGA 3, a fibre channel (FC) controller 5D, an expander 5E, a bus switch 6A, a cache memory 11, an exclusive LSI 12, a flash memory 13, and a system capacity unit (SCU) 14.

The CPU 2 and the monitoring FPGA 3 are examples of the CPU 2 and the monitoring FPGA 3 according to the embodiment illustrated in FIG. 1. Note that, the CPU 2 performs various processing operations in the CM 1' and for example, performs processing associated with the data access request or the like to the disk device 16a. In addition, the monitoring FPGA 3 in the CM 1'-1 and the monitoring FPGA 3 in the CM 1'-2 are connected to each other to communicate with each other and a redundant state of the CM 1' is controlled.

The FC controller 5D is an adapter that is connected with the host apparatuses 8-1 and 8-2 through a fibre cable to control communication between the host apparatuses 8-1 and 8-2. The expander 5E is an adapter that is connected with the BP 16 through a communication line such as an SAS cable, for example, to control various accesses to the disk device 16a by an instruction from the CPU 2. The FC controller 5D and the expander 5E are examples of the device 5 according to the embodiment.

The bus switch 6A is a switch that switches a connection state between the CM 1'-1 and the CM 1'-2. The bus switch 6A is one example of the bus switch 6A illustrated in FIG. 1. Note that, when the monitoring FPGA 3 detects a failure in the FC controller 5D of its own CM 1', the monitoring FPGA 3 switches a state of the bus switch 6A to an off state and separates its own CM 1' from the storage system 10.

The cache memory 11 is a memory that caches data regarding an access to the disk device 16a and is used to access the disk device 16a by the CPU 2. The exclusive LSI 12 is a processing device that performs a system control of the CM 1'. The flash memory 13 is a NAND type flash memory that holds control information used for control by the exclusive LSI 12. The SCU 14 is used as a temporary power supply source when supplying electric power to the CM 1' is cut off by a blackout and the like and may include, for example, an electric double layer condenser and the like.

Note that, the CPU 2 and the FC controller 5D, the CPU 2 and the expander 5E, and two CMs 1' (bus switches 6A) are connected by the high-speed transmission channel 7a, and as a result, the CPU 2 and the monitoring FPGA 3, two monitoring FPGAs 3, and the like are connected by the low-speed transmission channel 7b. A connection bus among other devices in FIG. 3 is not illustrated for easy description. Note that, in FIG. 3, connections among some devices are not illustrated for simplification of the drawing.

Note that, in FIG. 3, only one expander 5E is illustrated, but like the devices 5B and 5C illustrated in FIG. 1, each CM 1' may include the bus switches 6B and 6C and two redundant expanders 5E and be configured to perform a control associated with the redundant state by the monitoring FPGA 3.

As described above, the information processing apparatus 1 according to the embodiment illustrated in FIG. 1 is applied to the CM 1' of the storage system 10 illustrated in FIG. 3 to perform log collection or separation of a failure location by the monitoring FPGA 3 as described above, even in the case where the failure without the read response occurs in the FC controller 5D, for example. Therefore, the monitoring FPGA 3 may significantly acquire the log and significantly suppress the failure, which occurs in the FC controller 5D of one CM 1', from being propagated to the other CM 1' while the CPU 2 continuously operates.

[1-5] Operation Example of Information Processing Apparatus

Figure 4:
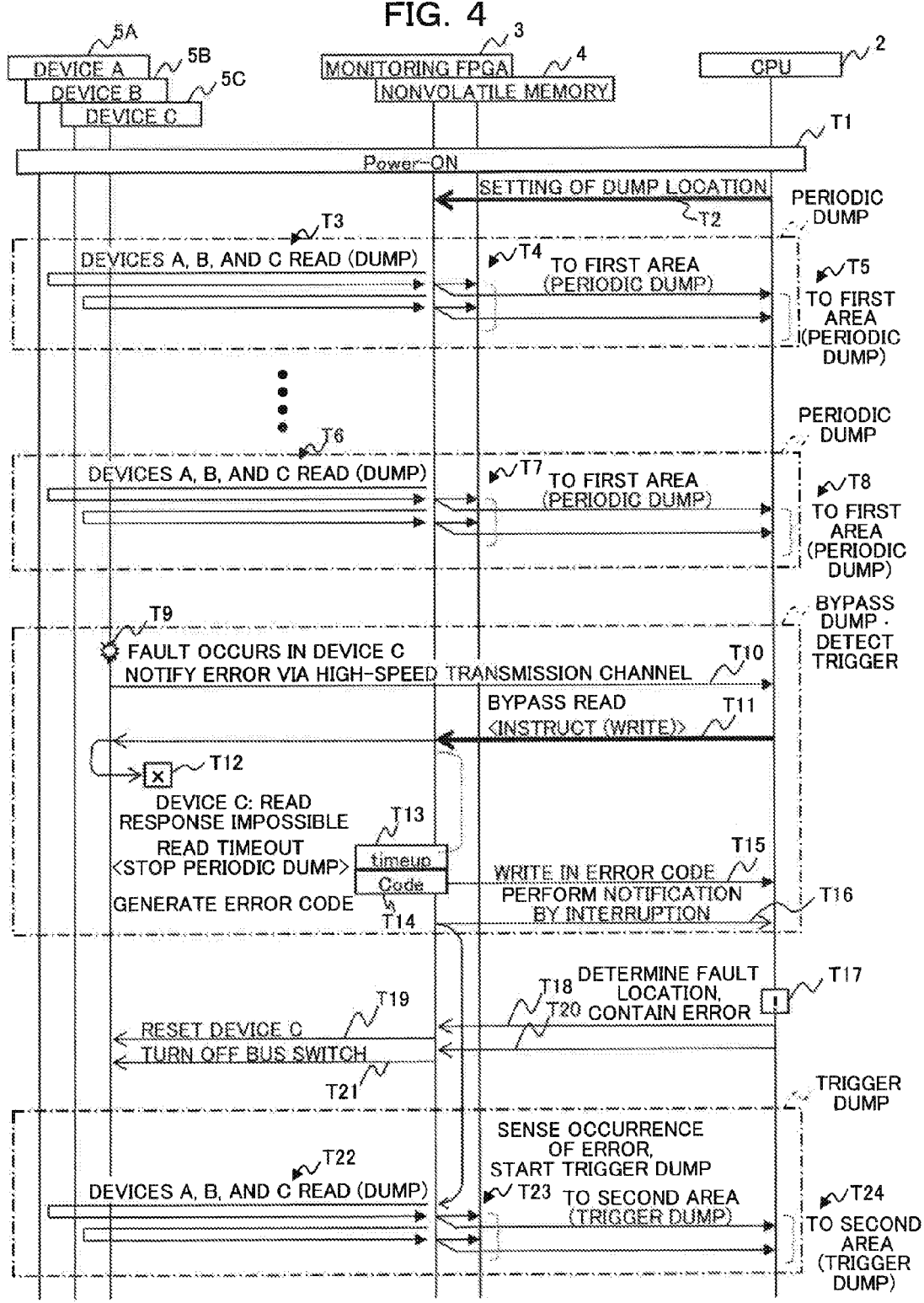
FIG. 4 is a sequence diagram describing an operation example of the information processing apparatus when an error is notified to a CPU from a device illustrated in FIG. 1 via a high-speed transmission channel.
Figure 5:
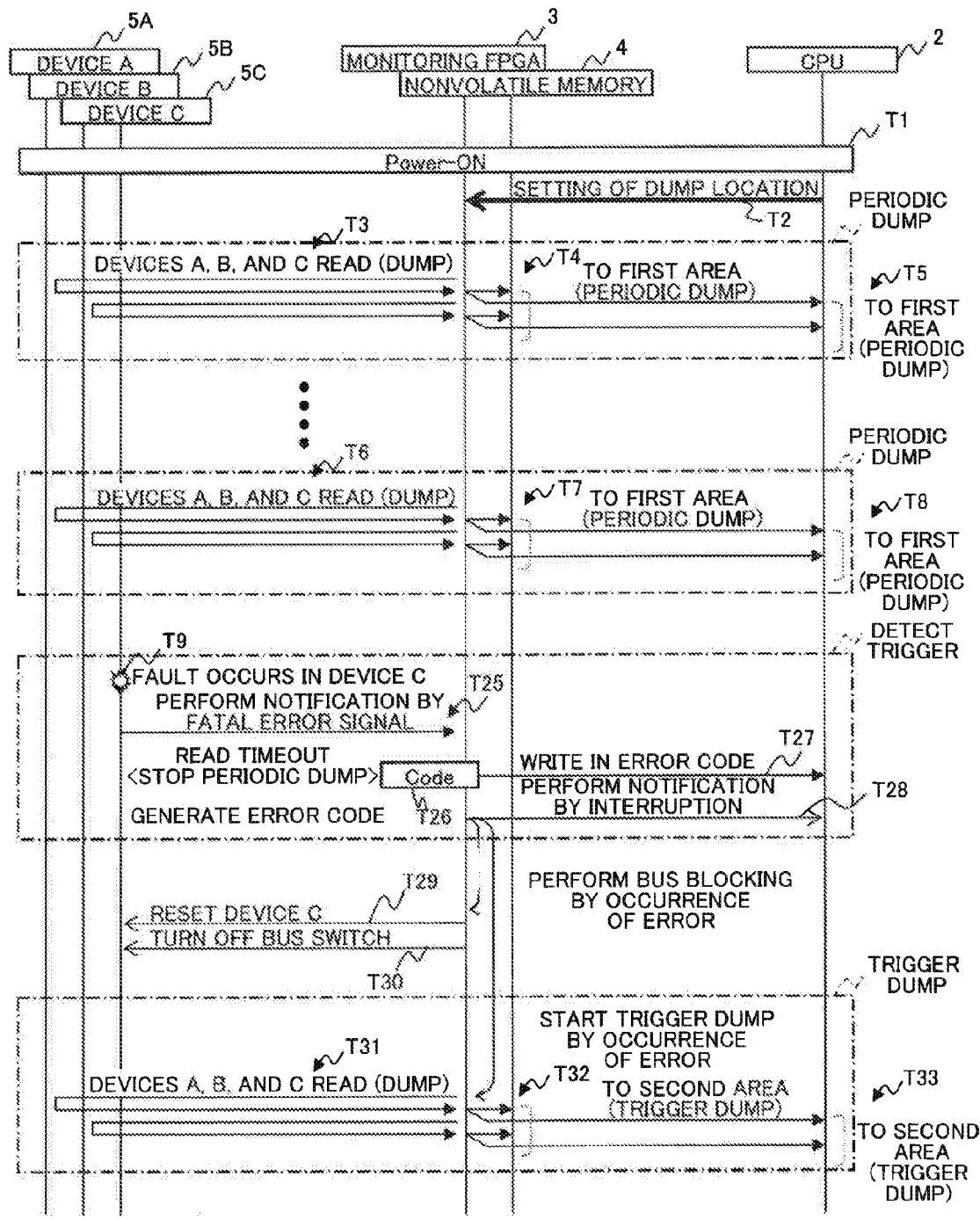
FIG. 5 is a sequence diagram describing an operation example of the information processing apparatus when an error is notified to a monitoring FPGA from the device illustrated in FIG. 1 via an exclusive transmission channel.
Figure 6:
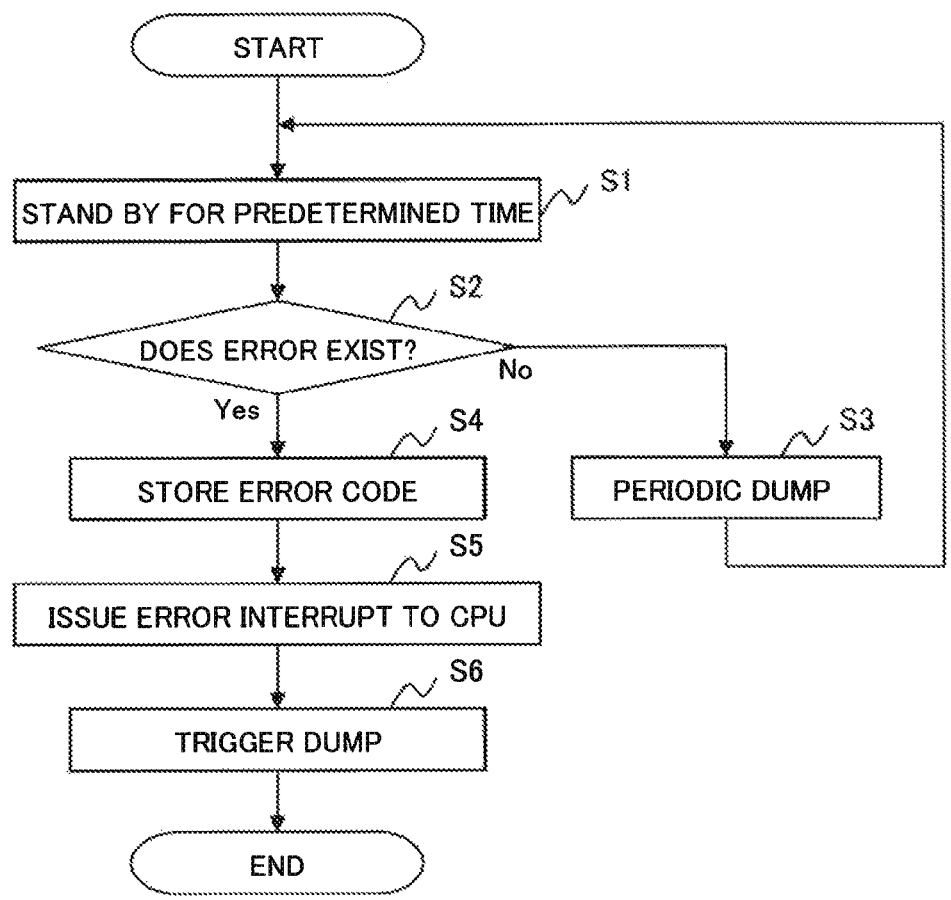
FIG. 6 is a flowchart describing an operation example of register dump by the monitoring FPGA illustrated in FIG. 1.

Next, an operation example of the information processing apparatus 1 illustrated in FIG. 1, which is configured as described above, will be described with reference to FIGS. 4 to 6. FIG. 4 is a sequence diagram describing an operation example of the information processing apparatus 1 when an error is notified to the CPU 2 from the device 5C illustrated in FIG. 1 via the high-speed transmission channel 7a. FIG. 5 is a sequence diagram describing an operation example of the information processing apparatus 1 when an error is notified to the monitoring FPGA 3 from the device 5C via the exclusive transmission channel 7c. FIG. 6 is a flowchart describing an operation example of register dump by the monitoring FPGA 3.

[1-5-1] Case in Which Error is Notified to CPU 2 from Device 5C via High-Speed Transmission Channel 7a First, with reference to FIGS. 4 and 6, an operation example of the information processing apparatus 1 when an error is notified to the CPU 2 from the device 5C via the high-speed transmission channel 7a will be described.

As illustrated in FIG. 4, after power is input into the information processing apparatus 1 (step T1), the table 34a indicating a dump location is set with respect to the second RAM 34 of the dump acquiring unit 32 by the CPU 2 (step T2).

In addition, after waiting for a predetermined time (step S1 of FIG. 6), the monitoring FPGA 3 determines whether the error is detected (whether the events of (i) to (iii) occur) (step S2 of FIG. 6). In the case where the error is not detected (No route of step S2 of FIG. 6), register dump (periodic dump) of the arranged device 5 is periodically performed by the monitoring FPGA 3 (step S3 of FIG. 6).

In detail, the read request is issued to the devices 5A to 5C to be dumped based on the table 34a by the dump acquiring unit 32 and register dump (log) is replied as the read response from each device 5 (step T3). In this case, the dump acquiring unit 32 stores the acquired log in the first area 33a of the first RAM 33. Subsequently, the log acquired by the dump acquiring unit 32 is transmitted to and stored in the first area 41a of the non-volatile memory 4 (step T4) and the first area 22a in the RAM 22 of the CPU 2 (step T5).

The monitoring FPGA 3 repeats the processing of steps T3 to T5 (No route of steps S1 and S2 of FIG. 6, and S3) until the error is detected in step S2 of FIG. 6 (steps T6 to T8).

Herein, a case in which the failure occurs in the device 5C (step T9) and the error is notified to the CPU 2 via the high-speed transmission channel 7a by the device 5C is assumed (step T10). In this case, for example, the bypass read (bypass dump) from the device 5C is instructed to the monitoring FPGA 3 by the CPU 2 (step T11). Note that, the instruction is actually processing of reading the log from the device 5C, but processing of writing the collected log in the third area 22c of the CPU 2 by the monitoring FPGA 3 when viewed from the CPU 2.

Subsequently, the read request is performed with respect to the device 5C by the dump acquiring unit 32, but since the device 5C is in impossible read response (step T12), a read timeout occurs in the dump acquiring unit 32 after a predetermined time elapsed (step T13). In this case, the failure detecting unit 31 detects that the failure occurs in the device 5C (the detection of the trigger by the (ii), a Yes route of step S2 of FIG. 6), and an error code of "0x1_1yy_xxxx" is created (step T14, see FIG. 2).

In addition, the failure detecting unit 31 stores the created error code in the code area 22d (and/or the code area 41c of the non-volatile memory 4) in the RAM 22 of the CPU 2 (step T15, and step S4 of FIG. 6). Further, the failure detecting unit 31 notifies the CPU 2 of the occurrence of the failure by interruption in addition to storing the error code (step T16, and step S5 of FIG. 6). Note that, the failure detecting unit 31 notifies the occurrence of the failure to the dump acquiring unit 32 simultaneously with notifying the occurrence of the failure to the CPU 2 by interruption.

When the storing of the error code and the notification by interruption are performed, the failure location is determined based on the log and the error code stored in the RAM 22 (step T17) and the error is blocked, by the CPU 2. In detail, the CPU 2 performs an instruction of resetting the device 5C which is the failure location (step T18) and an instruction of an off control of the bus switch 6C of an upstream (the CPU 2 side) of the device 5C, to the monitoring FPGA 3 (step T20). The monitoring FPGA 3 performs the resetting of the device 5C (step T19) and the off control of the bus switch 6C according to the instruction (step T21) and the failure location is separated from the system.

Further, the dump acquiring unit 32 executes the trigger dump with the occurrence of the failure notified from the failure detecting unit 31 in step T16 (step S6 of FIG. S6). In detail, the dump acquiring unit 32 issues the read request with respect to the devices 5A to 5C to be dumped based on the table 34a and replies register dump (log) as the read response from each device 5 (step T22). In this case, the dump acquiring unit 32 stores the acquired log in the second area 33b of the first RAM 33. Subsequently, the dump acquiring unit 32 transmits and stores the acquired log to and in the second area 41b of the non-volatile memory 4 (step T23) and the second area 22b in the RAM 22 of the CPU 2 (step T24).

By the above processing, an operation of the information processing apparatus 1 when the error is notified to the CPU 2 from the device 5C via the high-speed transmission channel 7a is completed.

[1-5-2] Case in Which Error is Notified to Monitoring FPGA 3 from Device 5C via Exclusive Transmission Channel 7c Next, with reference to FIGS. 5 and 6, an operation example of the information processing apparatus 1 when the error is notified to the monitoring FPGA 3 from the device 5C via the exclusive transmission channel 7c will be described.

Note that, since the processing of steps T1 to T9 of FIG. 5 is common to the processing of steps T1 to T9 of FIG. 4, a duplicated description will not be repeated.

In step T9, a case is assumed, in which the failure occurs in the device 5C, and as a result, the occurrence of the failure is notified to the monitoring FPGA 3 (failure detecting unit 31) via the exclusive transmission channel 7c by the signal FATAL_ERROR, by the device 5C (step T25). In this case, the failure detecting unit 31 detects that the failure occurs in the device 5C (the detection of the trigger by the (iii), a Yes route of step S2 of FIG. 6), and an error code of "0x2__1yy_xxxx" is created (step T26, see FIG. 2).

In addition, the failure detecting unit 31 stores the created error code in the code area 22d (and/or the code area 41c of the non-volatile memory 4) in the RAM 22 of the CPU 2 (step T27, step S4 of FIG. 6). Further, the failure detecting unit 31 notifies the CPU 2 of the occurrence of the failure by interruption in addition to storing the error code (step T28, and step S5 of FIG. 6). Note that, the failure detecting unit 31 notifies the occurrence of the failure to the dump acquiring unit 32 simultaneously with notifying the occurrence of the failure to the CPU 2 by interruption.

Further, the failure detecting unit 31 performs the error blocking (bus closing) by the occurrence of the failure. In detail, the monitoring FPGA 3 performs the resetting of the device 5C (step T29) and the off control of the bus switch 6C (step T30) and the failure location is separated from the system.

Further, the dump acquiring unit 32 executes the trigger dump with the occurrence of the failure notified from the failure detecting unit 31 in step T28 (step S6 of FIG. 6). In detail, the dump acquiring unit 32 issues the read request with respect to the devices 5A to 5C to be dumped based on the table 34a and replies register dump (log) as the read response from each device 5 (step T31). In this case, the dump acquiring unit 32 stores the acquired log in the second area 33b of the first RAM 33. Subsequently, the dump acquiring unit 32 transmits and stores the acquired log to and in the second area 41b of the non-volatile memory 4 (step T32) and the second area 22b in the RAM 22 of the CPU 2 (step T33).

By the above processing, an operation of the information processing apparatus 1 when the error is notified to the monitoring FPGA 3 from the device 5C via the exclusive transmission channel 7c is completed.

As described above, in the monitoring FPGA 3 according to the embodiment, when the failure occurs in the device 5, a collection result of the log is written in at least one of the RAM 22 of the CPU 2 and the non-volatile memory 4. As a result, even in the case where the failure without the read response occurs in the device 5, since the CPU 2 ends without collecting the log from the device 5, the CPU 2 may be prevented from being hung up by entering exceptional processing by a cause of the device 5 other than the CPU 2. Further, in the case where the CPU 2 intends to refer to the log of the device 5, the CPU 2 refers to its own RAM 22 or the non-volatile memory 4 without reading the arranged device 5.

Further, the monitoring FPGA 3 encodes the content of the failure which occurs for each phenomenon and notifies the encoded content to the CPU 2. As a result, the CPU 2 may determine whether the device 5 where the failure occurs is able to perform the read response, for example, and the access to the device 5 may be suppressed in the case where the read response is impossible, and thus the CPU 2 may be prevented from being hung up in accessing the device 5 by a purpose other than the collection of the log.

Further, the log of the arranged device 5 is periodically collected by the periodic dump by the monitoring FPGA 3 to be written in at least one of the RAM 22 of the CPU 2 and the non-volatile memory 4. Further, the log is stored in a separate area other than the storage area of the log by the periodic dump with the detection of the trigger as an opportunity, by the trigger dump by the monitoring FPGA 3. As a result, since the CPU 2 may refer to both logs just before and after the failure occurs in the device 5, it is effective to analyze the log.

Further, since the register dump or the detection of the trigger is executed by the monitoring FPGA 3 which is hardware, the CPU 2 may perform processing at a very high speed as compared with a case in which the register dump or the trigger is detected by software.

Note that, the occurrence of the hang-up of the CPU 2 in the case without the read response or the like is more remarkable in a case in which the CPU 2 is a general CPU. Therefore, the information processing apparatus 1 according to the embodiment is suitable when the information processing apparatus 1 is used in a system in which there are many cases in which the general CPU is adopted as the CPU 2, such as the storage system 10 illustrated in FIG. 3.

[2] Others

As described above, although the preferred embodiment of the invention has been described in detail, the invention is not limited to the specific embodiment and various modifications and changes can be made within the scope without departing from the spirit of the invention.

For example, although the non-volatile memory 4 is the memory such as the flash memory in the aforementioned embodiment, the non-volatile memory 4 is not limited thereto. For example, the non-volatile memory 4 may be a disk device such as an HDD or an SDD or other devices. Further, if electric power is able to be supplied from an auxiliary power supply such as a battery, or the like, a volatile memory may be used instead of the non-volatile memory 4.

Further, although a case of the three arranged devices 5 of the CPU 2 has been described as an example in the aforementioned embodiment, the number of the devices 5 is not limited thereto and may be less than 3, or 4 or more. Further, whether the information processing apparatus 1 or the device 5 is redundant does not influence application of the information processing apparatus 1 according to the embodiment.

Furthermore, in the aforementioned embodiment, it has been described that the information processing apparatus 1 includes the bus switches 6A to 6C, but the invention is not limited thereto. For example, in the case where the devices 5A to 5C have a function as a switch, the bus switches 6A to 6C may be omitted, and as a result, the monitoring FPGA 3 may control the function of the switch through the low-speed transmission channel 7b instead of a control line.

Further, in the sequence diagram illustrated in FIG. 4, the CPU 2 may notify the monitoring FPGA 3 that the error occurs in the device 5C without performing the instruction of the bypass read in step T11 when receiving the error notification from the device 5C via the high-speed transmission channel 7a in step T10. In this case, steps T12 and T13 are not performed and the monitoring FPGA 3 executes the processing of steps T27 to T33 of FIG. 5 by creating an error code of "0x0_0yy_xxxx" based on the detection of the trigger by the (i).

According to the disclosed technology, even in the case where the failure without the read response occurs in a device to be monitored, the status information can be securely acquired while continuously performing the operation of the processing apparatus.

All examples and conditional language provided herein are intended for pedagogical purposes to aid the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A monitoring device which monitors an device to be monitored, wherein
the monitoring device is inserted and installed between the device to be monitored and a processing device that performs process for the device to be monitored, and
the monitoring device comprises:
a detection unit that detects a failure which occurs in the device to be monitored;
a notification unit that generates failure information indicating a content of the failure detected by the detection unit, and notifies the generated failure information and occurrence of the failure to the processing device; and
an acquisition unit that, in accordance with the occurrence of the failure, accesses to the device to be monitored to acquire status information from the device to be monitored and stores the status information in a storage unit, the status information indicating status of the device to be monitored after the occurrence of the failure thereof.

2. The monitoring device according to claim 1, wherein the acquisition unit
periodically accesses to the device to be monitored to acquire status information from the device to be monitored and stores the acquired status information in a first area of the storage unit, and
in accordance with the occurrence of the failure, suppresses the periodical access to the device to be monitored to acquire the status information, and accesses to the device to be monitored to acquire status information and stores the acquired status information in a second area in the storage unit.

3. The monitoring device according to claim 2, wherein the acquisition unit stores the acquired periodic status information in the first area of the storage unit which is a nonvolatile memory to which the processing device is accessible and stores the acquired status information after the failure occurs in the second area of the nonvolatile memory.

4. The monitoring device according to claim 2, wherein the acquisition unit stores the acquired periodic status information in the first area of the storage unit which is a memory of the processing device and stores the acquired status information after the failure occurs in the second area of the memory.

5. The monitoring device according to claim 4, wherein the acquisition unit accesses to the device to be monitored to acquire the status information from the device to be monitored, which is instructed by an acquisition request and stores the acquired status information in a third area of the memory when receiving the acquisition request of the status information of the device to be monitored from the processing device.

6. The monitoring device according to claim 1, wherein the detection unit separates the device to be monitored where the failure occurs from a system when the notification unit notifies the generated failure information and the occurrence of the failure to the processing device.

7. The monitoring device according to claim 1, wherein the detection unit is connected with the device to be monitored through a signal line for notifying the occurrence of the failure and detects the failure when receiving a notification through the signal line from the device to be monitored.

8. The monitoring device according to claim 7, wherein the detection unit detects the failure in at least one case of the case in which the notification of the occurrence of the failure is received from the processing device, the case in which the failure occurs in the periodic acquisition of the status information by the acquisition unit, and the case in which the notification is received from the device to be monitored through the signal line.

9. The monitoring device according to claim 1, wherein the notification unit stores the generated failure information in a predetermined area of the storage unit, and notifies the occurrence of the failure to the processing device by interruption.

10. The monitoring device according to claim 1, wherein the processing device is a processor, and the monitoring device is a monitoring circuit.

11. An information processing apparatus, comprising:
an device to be monitored;
a processing device that performs process for the device to be monitored;
a monitoring device that monitors the device to be monitored; and
a storage unit that stores a monitoring result by the monitoring device, wherein the monitoring device is inserted and installed between the device to be monitored and the processing device, and includes:
- a detection unit that detects a failure which occurs in the device to be monitored;
- a notification unit that generates failure information indicating a content of the failure detected by the detection unit, and notifies the generated failure information and occurrence of the failure to the processing device; and
- an acquisition unit that, in accordance with the occurrence of the failure, accesses to the device to be monitored to acquire status information from the device to be monitored and stores the status information in the storage unit, the status information indicating status of the device to be monitored after the occurrence of the failure thereof.

12. A monitoring method in a monitoring device comprising:
- monitoring the device to be monitored by the monitoring device, the monitoring device being inserted and installed between an device to be monitored and a processing device that performs process for the device to be monitored;
- detecting a failure which occurs in the device to be monitored;
- generating failure information indicating a content of the detected failure;
- notifying the generated failure information and the occurrence of the failure to the processing device; and
- accessing, in accordance with the occurrence of the failure, to the device to be monitored to acquire status information and storing the acquired status information in a storage unit, the status information indicating status of the device to be monitored after the occurrence of the failure thereof.

13. The monitoring method according to claim 12, wherein in the storing,
- the status information is periodically acquired by a periodic access from the device to be monitored and stored in a first area of the storage unit, and
- in accordance with the occurrence of the failure, the periodic access to the device to be monitored to acquire the status information is suppressed, and an access to the device to be monitored to acquire the status information is performed and the acquired status information is stored in a second area of the storage unit.

14. The monitoring method according to claim 13, wherein in the storing,
- the acquired periodic status information is stored in the first area of the storage unit which is a nonvolatile memory to which the processing device is accessible, and
- the acquired status information after the failure occurs is stored in the second area of the nonvolatile memory.

15. The monitoring method according to claim 13, wherein in the storing,
- the acquired periodic status information is stored in the first area of the storage unit which is a memory of the processing device, and
- the acquired status information after the failure occurs is stored in the second area of the memory.

16. The monitoring method according to claim 15, wherein the status information is acquired by an access from the device to be monitored, which is instructed by an acquisition request and the acquired status information is stored in a third area of the memory when the acquisition request of the status information of the device to be monitored from the processing device is received.

17. The monitoring method according to claim 12, wherein in the detecting,
- the device to be monitored where the failure occurs is separated from a system when the generated failure information and the occurrence of the failure are notified to the processing device in the notifying.

18. The monitoring method according to claim 12, wherein in the detecting,
- the failure is detected when a notification is received from the device to be monitored through a signal line for notifying the occurrence of the failure.

19. The monitoring method according to claim 18, wherein in the detecting,
- the failure is detected in at least one case of the case in which the notification of the occurrence of the failure is received from the processing device, the case in which the failure occurs in the periodic acquisition of the status information by the storing, and the case in which the notification is received from the device to be monitored through the signal line.

20. The monitoring method according to claim 12, wherein in the notifying,
- the generated failure information is stored in a predetermined area of the storage unit, and
- the occurrence of the failure is notified to the processing device by interruption.

* * * * *